Figure 1:
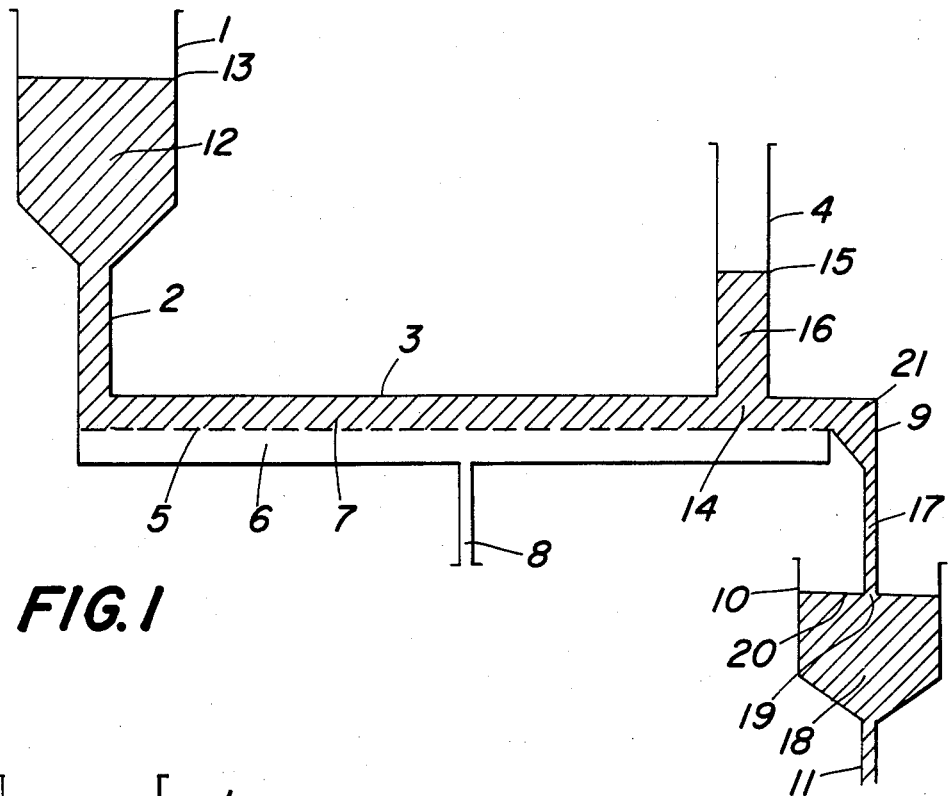

United States Patent [19]

Hanrot et al.

[11] Patent Number: 4,659,263
[45] Date of Patent: Apr. 21, 1987

[54] CLOSED APPARATUS PROVIDING POTENTIAL FLUIDIZATION FOR HORIZONTALLY CONVEYING POWDER MATERIALS

[75] Inventors: Jean-Pascal Hanrot, Aix en Provence; Jacky Volpeliere, Gardanne, both of France

[73] Assignee: Aluminum Pechiney, France

[21] Appl. No.: 821,205

[22] PCT Filed: Oct. 18, 1983

[86] PCT No.: PCT/FR83/00211
§ 371 Date: Jun. 13, 1984
§ 102(e) Date: Jun. 13, 1984

[87] PCT Pub. No.: WO84/01560
PCT Pub. Date: Apr. 26, 1984

Related U.S. Application Data

[63] Continuation of Ser. No. 620,311, Jun. 13, 1984, abandoned.

[30] Foreign Application Priority Data

Oct. 22, 1982 [FR] France .................. 82 17859

[51] Int. Cl.⁴ .............................................. B65G 53/22
[52] U.S. Cl. ........................................ 406/89; 204/67; 204/245; 406/156

[58] Field of Search ................. 406/89, 155, 156; 204/67, 245

[56] References Cited

U.S. PATENT DOCUMENTS

| | | | |
|---|---|---|---|
| 3,870,374 | 3/1975 | Wentzel, Jr. et al. | 406/155 X |
| 4,016,053 | 4/1977 | Stankovich et al. | 406/155 X |
| 4,299,683 | 11/1981 | Adorno et al. | 406/89 X |
| 4,450,053 | 5/1984 | Merz et al. | 204/67 |

OTHER PUBLICATIONS

Materials Handling News, No. 257, Oct. 1978, p. 97, FIG. 6.

Primary Examiner—Jeffrey V. Nase
Attorney, Agent, or Firm—McDougall, Hersh & Scott

[57] ABSTRACT

An improved closed apparatus for conveying powder materials from a storage region to at least one region to be supplied. The apparatus includes at least one horizontal conveyor formed by a lower gas flow duct, an upper duct for flow of the powder and gas, and a porous wall separating the ducts. At least one conduit supplies gas to the lower duct, permitting the establishment of a pressure Pf. The conveyor is provided with at least one balancing column the height of filling of which balances the pressure Pf of the potential fluidization gas for the purpose of potentially fluidizing the material filling the conveyor.

1 Claim, 3 Drawing Figures

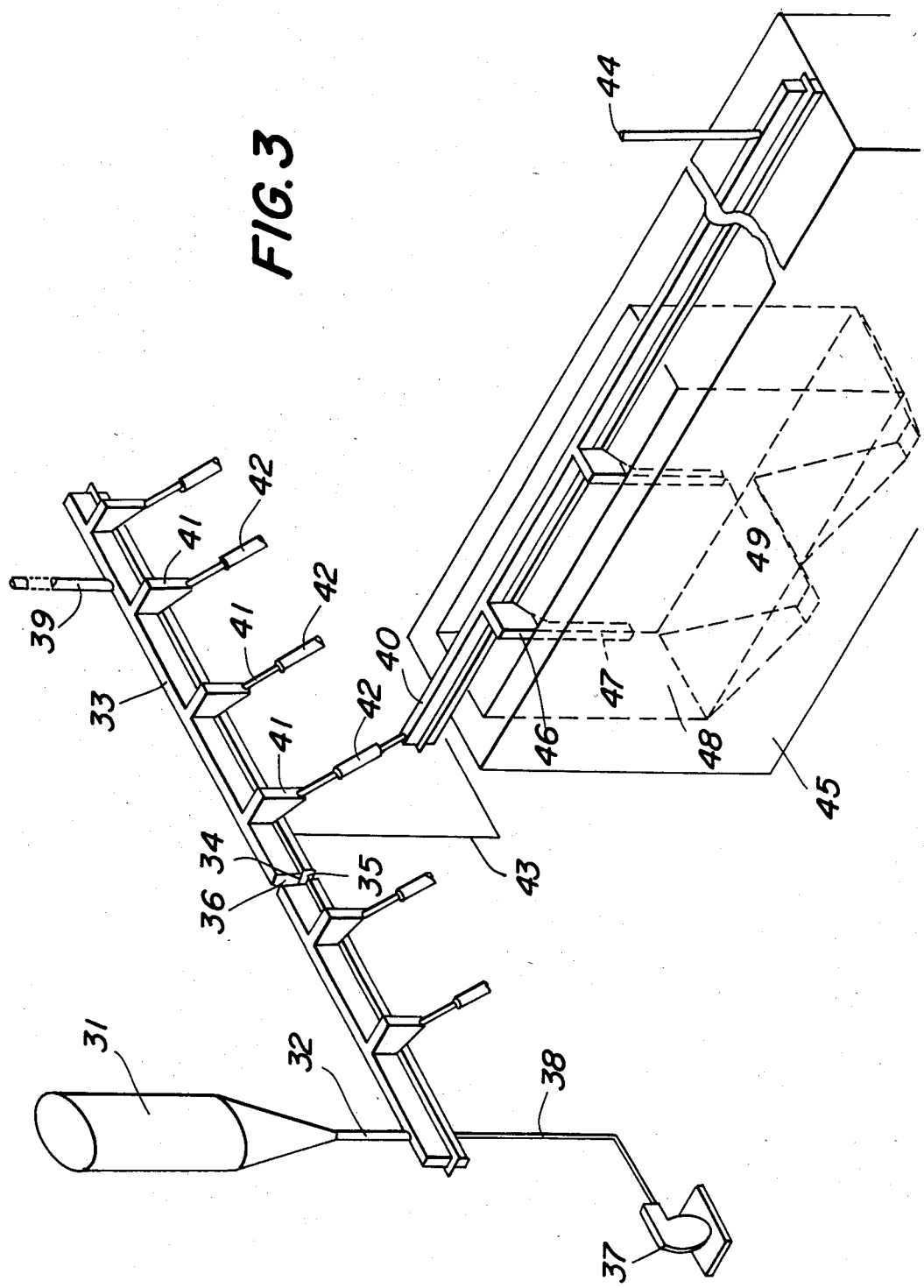

CLOSED APPARATUS PROVIDING POTENTIAL FLUIDIZATION FOR HORIZONTALLY CONVEYING POWDER MATERIALS

This application is a continuation of application Ser. No. 620,311, filed 6/13/84, now abandoned.

The invention concerns a closed apparatus providing potential fluidisation for the horizontal or inclined conveying of materials having the characteristics of fluidisable powders, from a storage region to at least one region to be supplied therewith, said regions being spaced from each other.

The invention also concerns a continuous process for transporting and feeding 'reserve containers' with powder substance such as alumina, which makes it possible to supply a packaging processing assembly such as a bagging apparatus or a container filling apparatus, or a production assembly such as an extrusion press or igneous electrolysis tanks in a workshop, from a single region for storing such materials.

The term fluidisable materials is used to cover all the materials, well known to the man skilled in the art, which occur in powder form, being of such granulometry and cohesion that the speed of flow of the air which is blow thereinto has the effect, at low speed, of causing the particles to lose adhesion with each other, and a reduction in the internal frictional forces. Such materials are for example alumina which is intended for igneous electrolysis, cements, plasters, quicklime or slaked lime, fly ash, calcium fluoride, rubber filler material, fecula, catalysts, carbon dusts, sodium sulphate, phosphates, polyphosphates, pyrophosphates, plastics materials in powder form, food substances such as powder milk, flours, etc.

It is well known that such processes have been researched and developed for fluidised-bed transportation of materials in powder form. One example of many is that which involves feeding alumina to igneous electrolysis cells for the production of aluminum.

For that purpose, the alumina, being a powder substance which is transported and solubilised in the electrolytic bath, is progressively consumed as the electrolysis operation takes place, and must be replaced as it is consumed, in such a way that the level of concentration of solubilised alumina is kept within the suitable limits for operation of the cell at full output. Hence, it is necessary to control the amount of alumina which is introduced into the electrolysis tank in such a way that operation thereof is not detrimentally affected by an excess or a deficiency of alumina.

Many apparatuses have been proposed by the man skilled in the art and described in the specialist literature, which are intended to permit a regular feed of alumina to the electrolysis tank. A first apparatus, as described in French patent No. 2 099 434, makes it possible to supply alumina to the electrolysis cell and comprises an alumina storage tank below which is disposed a measuring apparatus for regulating the amount of alumina that issues from the tank and finally a means for the fluidised transportation of the alumina, that means also being known by the term of 'air float conveyor', which is disposed between the measuring apparatus and the cell to be supplied with alumina, the alumina tank and the measuring apparatus being disposed laterally beside the cell. The conveyor means is itself provided with outlet pipes for feeding the cell at a number of points by way of dip tubes which are displaced with an 'up-and-down' movement, each delivering substantially the same amount of alumina.

However, such an apparatus suffers from major disadvantages from the point of view of industrial use thereof. In fact, such an apparatus is designed in such a way that it can supply only a single electrolysis tank whereas there is a need to supply a series of electrolysis tanks, comprising for example 60 units. In addition, that apparatus is provided with a storage tank that is remote from the single electrolysis tank that it can feed and hence it gives rise to a substantial response time between the moment of a demand being made for powder materials, and the moment at which the electrolysis tank is supplied with such material. In addition, that apparatus is provided with a plurality of points at which the powder material is introduced into the electrolysis tank, which do not guarantee that the amount of powder material introduced at each point is equal.

In addition to the above-mentioned disadvantages, as the measuring apparatus is disposed upstream of the air float conveyor, the powder material to be conveyed is totally fluidised so that a layer of gas flowing at high speed is generated between the upper surface of the fluidised bed as it moves, and the ceiling member of the air float conveyor, that layer of high-speed gas entraining therewith the very fine particles of the powder material being conveyed. In addition, as the air float conveyor does not have means for removing or discharging the gaseous phase, all the fluidisation air is introduced into the electrolysis tank at the same time as the alumina, thereby increasing the amounts of very fine particles which are lost by virtue of being carried off, at the location of the electrolysis tank.

The problem encountered by the man skilled in the art is the problem of long-distance transportation of a powder material which is stored in a silo of very large capacity, for the purposes of supplying packaging or processing workshops which are at some hundreds of meters from the silo, which problem has been overcome hitherto by using for example movable containers, high-pressure pneumatic conveyor means or mechanical conveyor means.

More recently, another apparatus for supplying alumina to an electrolysis cell at multiple points was described in U.S. Pat. No. 4,016,053. The apparatus which makes it possible to convey a powder material from a storage area to an area in which it is consumed comprises firstly a primary, fluidised-bed conveyor which is provided with means for introducing and discharging the gas used for fluidising and transporting the powder materials coming from the storage area, and to maintain the primary conveyor substantially full of fluidised materials, and then comprises a plurality of coveyors for supplying and discharging the gas used for fluidising and transporting the powder materials coming from the primary conveyor and maintaining the secondary conveyors continually full with fluidised powder materials, and finally comprises means for the discontinuous feed of powder materials to each electrolysis tank by the force of gravity, each such supply means being supplied by way of one of the secondary fluidised-bed conveyors.

Now, and this is a serious disadvantage, the apparatus described in U.S. Pat. No. 4,016,053 is required to keep the powder material in a permanent condition of fluidisation, whether or not there is a requirement for the electrolysis cell to be supplied with material, so that accordingly, that apparatus consumes substantial amounts of fluidisation gas and consequently energy. In addition, and this is another major disadvantage, in order for the powder materials in the apparatus to remain in a permanent condition of fluidisation, there is, between the upward surface of the fluidised bed and the ceiling member of the air float conveyor, a flow of gas which moves constantly and at high speed towards the discharge vents, thereby entraining out of the apparatus up to 10% by weight of the flow of powder material in the air float conveyor.

Thus, the arrangements described in the prior art are not capable of fully satisfying the user thereof, as they are found to be complicated and troublesome from the point of view of industrial application, by virtue of the amounts of energy that they require for consumption, for example in the case of loading-unloading apparatuses and pneumatic conveyor systems, or by virtue of the losses of powder materials that they cause, or by virtue of the use of carriages, handling equipment, travelling cranes, movable feed hoppers, etc.

It is for that reason that the present applicants, continuing their research in this area, developed an apparatus for transporting powder materials in dense bed form, which does not suffer from the above-indicated disadvantages.

The closed apparatus, according to the invention, providing potential fluidisation, for conveying powder materials from a storage region to at least one region to be supplied, which comprises, between said two regions, at least one horizontal or inclined conveyor provided with fluidisation means, and formed by a lower gas circulation duct, an upper duct for circulation of the powder material and the gas, with a porous wall being disposed between the ducts, and at least one pipe for supplying the lower duct with gas, is characterised in that, for the purpose of potentially fluidising the powder material filling the conveyor, the conveyor is provided with at least one balancing column, the height of filling of which balances the pressure of the potential fluidisation gas.

In order properly to understand potential fluidisation which occurs in accordance with the present invention, it is appropriate to recall what fluidisation is, as is habitually employed in the prior art for conveying powder materials.

In accordance with the prior art, as may be found for example in above-mentioned U.S. Pat. No. 4,016,053, the fluidisation gas is introduced at a given pressure Pf below the porous fluidisation wall which separates the low duct for the flow of gas and the upper duct for circulation of the power material, in a horizontal conveyor. The fluidisation gas flows through the porous wall then passes between the particles in the rest condition of the powder material, forming the layer to be fluidised. The thickness of the layer in the rest condition is very much less than the height of the upper duct of the conveyor.

As soon as the speed of flow of the gas in the interstitial space existing between the particles is sufficiently high, the particles are mobilised and then lifted, each particle losing its points of permanent contact with the neighbouring particles. In that way, internal friction as between particles is reduced and the particles are put into a state of dynamic suspension. Hence, each particle subjected to the action of the gas flow is subjected to a lifting force due to the speed of the gas in contact with that particle, that speed being of the order of the rate of fall of that particle in air.

Accordingly, that results in an increase in the initial volume of the powder material and at the same time a reduction in apparent density.

According to the invention, the powder material, when there is no injection of fluidisation gas, completely fills the conveyor apparatus, in particular the upper duct for the flow of powder material in the horizontal or inclined conveyor. The particles of the powder material, in the rest condition, form a layer of such material to be conveyed, the thickness of that layer being virtually equal to the height of the upper duct. As soon as gas is introduced under the porous fluidisation wall which separates the lower duct for the flow of gas from the upper duct for the flow of powder material, the pressure of the gas being the same pressure Pf as that which would be employed in the prior art for fluidising the powder material, the balancing column is filled with that same material to a pressure head which balances the pressure Pf and prevents an increase in the size of the interstitial spaces between the particles. Accordingly, the provision of the balancing column prevents fluidisation of the powder material present in the horizontal or inclined conveyor, as the applicants have been able to confirm in carrying out their many experiments. In addition, as the interstitial spacing between the particles does not increase, the permeability of the medium in regard to the gas which is introduced at the pressure Pf is at a very low level and limits the gas flow to a very low valve, by virtue of the section of the balancing column. This, and in order to illustrate the phenomenon observed by the applicants, the powder material to be conveyed, which is for example alumina, being subjected to a fluidisation pressure Pf of 80 millibars, in the case of the prior art arrangement as can be found for example in U.S. Pat. No. 4,016,053, the gas flow rate corresponding to the pressure Pf, causing fluidisation of the powder material, is of the order of $33.10^{-3} m^3.m^{-2}.s^{-1}$, whereas in the case of the present invention, and with the same pressure Pf, the gas flow rate is only of the order of $4.10^{-3}.m^3.m^{-2}.s^{-1}$, which flow rate is too low to be able to cause fluidisation of the alumina throughout the conveyor.

The balancing column according to the invention is preferably vertical. It may be mounted on the axis of the conveyor or positioned laterally and connected to the upper part of the conveyor by and suitable means. The column is generally tubular and its section, in a plane perpendicular to its axis, may be circular, elliptical or polygonal.

By pursuing their research and carrying out their experiments for the purpose of developing and perfecting the apparatus according to the invention, the applicants formed and established that the various technical parameters of the balancing column, as well as the many parameters involved in the powder material to be conveyed, were associated in relationships such as to define the minimum total area $\sigma$ that the cross section or sections of the columns must have, in proportion to the total area of the porous wall: S. Thus, for an apparatus providing potential fluidisation for conveying powder material, in accordance with the invention, comprising a storage region, at least one closed, horizontal or inclined conveyor and at least one column for balancing of said conveyor, with a fluidisation gas pressure Pf and a total area S of the porous wall, the minimum total area $\sigma$ of the cross section of the balancing column or columns must comply with the following relationship:

$$\sigma \geqq (S/200)$$

Preferably, the minimum total area $\sigma$ is selected to lie within the following limits which were determined experimentally:

$$(S/200) \leqq \sigma \leqq (S/20)$$

In the particular case of alumina, the applicants found from experiment that the minimum total area $\sigma$ that the cross section of the balancing column or columns must have, must be at least equal to $S/100$ and preferably between $S/100$ and $S/50$.

The height of the column must be at least equal to the value extracted from the equilibrium relationship:

$$Pf = H \cdot \rho$$

in which $\rho$ is the specific weight of the powder material present in the column and Pf is the fluidisation gas pressure.

In general, the apparatus according to the invention is provided with one balancing column but, where the fluidised-bed conveyor is particularly long, it may be an attractive proposition for a conveyor to be provided with at least two balancing columns.

The balancing column according to the invention is applied unrestrictedly to any installation for transporting powder materials, which provides for potential fluidisation, from a storage region to a region for consumption of such material, comprising a primary, potential-fluidisation conveyor for feeding a plurality of secondary, potential-fluidisation conveyors which are independent of each other, each secondary conveyor feeding a plurality of tertiary potential-fluidisation conveyors which are independent of each other, each tertiary conveyor feeding the consumption region by way of a suitable storage device. In other words, the balancing column according to the invention is successfully applied to an array of potential-fluidisation conveyors disposed in a cascade arrangement.

Figure 2:
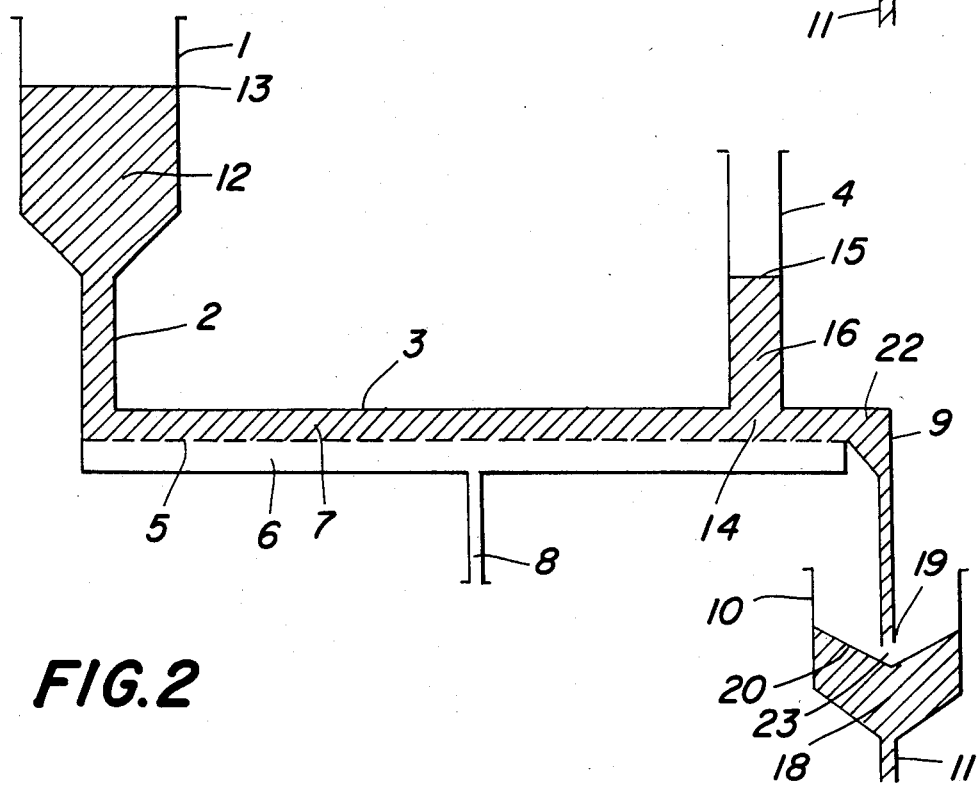

The invention will be better appreciated by reference to the non-limiting description of FIGS. 1, 2 and 3 illustrating a mode of operation and an industrial application of the apparatus.

FIG. 1 is a simplified view in vertical section of the apparatus according to the invention, comprising a single horizontal conveyor and showing the powder material in a rest condition, although the gas enclosed therein is maintained at a potential fluidisation pressure, FIG. 2 is a simplified view in vertical section of the apparatus according to the invention, comprising a single horizontal conveyor and showing the powder material in a dynamic phase, that is to say, supplying a consumption region which is at a distance from the storage region, and FIG. 3 is a perspective view, with some areas partially cut away for viewing, of a complete conveyor installation in accordance with the apparatus of the invention.

Referring to FIGS. 1 and 2, the closed apparatus providing potential fluidisation for the horizontal or inclined conveying of a powder material comprises an air storage container 1 for the material to be conveyed, which is connected by a conduit 2 to a conveyor 3 of the fluidisation air-float conveyor type, a balancing column 4, a means 9 for discharge from the conveyor, and a storage container 10 for the conveyed material, which is to be consumed by the means 11.

The air storage container 1 contains the powder material 12 in loose bulk form, being subject to atmospheric pressure. The container 1 operatively communicates with one of the ends of the horizontal (or inclined) conveyor 3 by way of the conduit 2. The conveyor 3 which is of a straight elongate configuration comprises a porous fluidisation wall 5 having a total area S, which separates the lower duct 6 for the flow of gas and the upper duct 7 for the flow of powder material. Close to the other end of the horizontal conveyor 3 is disposed a balancing column 4, the minimum total area $\sigma$ of the section of which must be at least equal to $S/200$ which disposed at said other end, which is remote from the storage container 1, is a discharge means 9 which converts the horizontal movement of the powder material into a vertical movement, for feeding a storage container for storing the conveyed material, which is disposed below the horizontal conveyor 3. The conveyed material storage container 10 in turn feeds a region (not shown) in which the material is consumed by the means 11.

FIGS. 1 and 2 will now be compared in order to describe the movement of the gaseous fluids and powder materials.

As shown in FIG. 1, the powder material, in loose bulk form, occupies the whole of the conveyor apparatus according to the invention, thereby expressing the fact that the apparent specific weight of the powder material which fills the apparatus in the regions 12, 7, 14, 16, 21, 17 and 18 is the same as that of the material when stored in a heap at atmospheric pressure. The upper level of the material in the container 1 must always be higher than the upper level reached by the powder material in the column 4 when the apparatus is subjected to a gas pressure Pf. As soon as a gas pressure Pf is applied, by way of the conduit 8, underneath the porous wall 5, which pressure is identical to that which would be applied in a fluidised-bed air-float conveyor, the powder material to be conveyed occupies the column 4 up to a level 15, at a pressure head height such as to balance the gas pressure Pf. As the storage container 10 is sufficiently filled with the conveyed powder material, the outlet 19 of the discharge means 9 is immersed in the region 20 of the powder material 18. The resulting balanced condition is maintained as it is as long as the demand for material to be consumed, from the conduit 11, does not cause the outlet 19 to be cleared, by virtue of a drop in the level of material as indicated at 20.

Referring to FIG. 2, the consumption of powder material stored in the container 10 is such that the level 20 of that material is below the outlet 19. As soon as the outlet 19 is open, powder material escapes by way of the discharge means 9 and the outlet 19, by virtue of decompression of the gas enclosed in the region 22 of the conveyor 3, which is closest to the consumption region downstream of 11 (not shown). As soon as the consumption region has received the required amount of powder, the outlet 19 is again closed off, thereby restoring the balanced conditions shown in FIG. 1. The region 22 is then re-supplied with powder by its progressively falling in or collapsing, in an upstream direction, as far as the silo 1.

FIG. 3 shows an installation for supplying alumina to a series of electrolytic cells for the production of aluminium. A cell for the igneous electrolysis of alumina requires a regular feed of alumina to the molten bath as the alumina is consumed, in respect of time, by means of a storage region disposed above each cell, to feed the bath from a plurality of points.

The closed apparatus according to the invention for conveying alumina from a storage to at least one consumption region comprises the means described hereinafter:

An air storage container 31 for storing alumina, which is of greater or smaller capacity according to requirements, and which is disposed at a spacing from the electrolysis workshop area, is positioned at a location on the industrial site which is readily accessible to permit the container to be supplied with alumina by road or rail container or any other handling means. The container 31 is connected to a primary conveyor 33 by means of a conduit 32 to provide a gravity feed. The first primary conveyor 33, of potential fluidisation type, the length of which is equivalent to the length of the part of the electrolysis working area to be supplied, comprises a porous wall 34 having a total area $S_1$, which separates the lower gas flow duct 35 and the upper powder material flow duct 36. The lower gas flow duct 35 is supplied with gas by means of the fan 37 and the conduit 38. The upper duct 36 is provided with a balancing column 39, the minimum total area $\sigma_1$ of the section of which must be at least equal to $S_1/100$. The primary conveyor 33 is connected to secondary potential-fluidisation conveyors 40, by means of lateral tappings 41 and conduits 42. The secondary fluidisation conveyors 40 are of the same type as the primary potential-fluidisation conveyor 33. They are supplied with gas by way of the conduits 43 connecting the lower gas flow duct 35 of the primary conveyor 33 to the lower gas flow ducts of the secondary potential-fluidisation conveyors 40. Each secondary conveyor 40 may be provided with a balancing column 44. Each secondary conveyor 40 extends longitudinally above an electrolysis tank as diagrammatically illustrated at 45. Lateral tappings 46 supply alumina to dip tubes 47 which discharge the powder material into storage containers 48 disposed above each electrolysis tank. The storage containers 48 are possibly provided with means (not shown) for closing off their outlet, such closure means being controlled by the electrolysis cell. Likewise, the ends 49 of the tubes 47 may be provided with closure means controlled in dependence on the feed to the electrolysis cell, or may be closed off by an increase in the level of alumina in the respective container 48.

EXAMPLE (as shown in FIG. 3)

An apparatus for conveying alumina, of potential-fluidisation type, in accordance with the invention, was constructed, which provided a feed of the powder material to 16 igneous electrolysis tanks with a daily consumption of 1T/tank/24 hours of alumina over a period of 600 days. The capacity of the storage container 31 was 100 m³ and it contained on average 60 tonnes of alumina. It supplied a primary potential-fluidisation conveyor by a gravity feed at a rate of 0.7 tonne per hour. The primary potential-fluidisation conveyor 33 was of a total length of 80 meters and was supplied with alumina by means of the air container 31. The height of the conveyor was 0.35 m, and its width was 0.12 m, while the area $S_1$ of the porous wall was 10 m².

The gas flow duct 35 of the primary conveyor was fed by means of the fan 37 at a rate of 150 m³/hour, at a pressure Pf of 0.08 bar.

The primary potential-fluidisation conveyor 33 was provided with five balancing columns 39. Each column was 2 meters in height, and the area of its horizontal section was 0.03 m².

The primary potential-fluidisation conveyor 33 was provided with 16 lateral tappings 41, each tapping 41 providing a gravity feed to a secondary potential-fluidisation conveyor 40 at a rate of 1T/tank/24 hours of alumina.

Each secondary conveyor 40 was 6 m in length, 0.25 m in height and 0.06 m in width. The area of its porous wall was 0.4 m², that wall being supplied with gas by the fan 37 at a rate of 6 m³/hour at a pressure Pf of 0.08 bar.

Each secondary conveyor 40 was provided with two lateral tappings supplying alumina to the storage containers 48 by way of dip tubes 47.

Each storage container which was disposed above the electrolysis tank that it supplied had a capacity of 1.2 m³ and contained on average 1 T of alumina.

When the alumina in each container 48 was in excess, the end 49 of the tube 47 was obviously closed off. In contrast, when the alumina in each container 48 was below a certain amount, the end 49 of the tube 47 was cleared and the apparatus according to the invention supplied alumina to the storage container 48.

The conveyor apparatus according to the invention consumed 1.3 KWh for a gas flow rate of 250 m³/hour per tonne of alumina transported, whereas, in accordance with the prior art, the same apparatus but without a balancing column would have required 10.0 KWh for a gas flow rate of 2000 m³/hour per tonne of alumina transported.

We claim:

1. A method for potentially fluidizing and conveying powder materials in a conveyor located between a storage region and a supply hopper, the method comprising the steps of:
   (a) completely filling said conveyor with non-fluidized powder material;
   (b) supplying a gas to the conveyor to permit fluidizing of the powder material;
   (c) preventing fluidization of the powder material by filling a balancing column in communication with said conveyor with powder material to create a pressure head which counterbalances the fluidization gas pressure;
   (d) permitting immediate fluidization of the powder upon withdrawal of powder from said supply hopper, due to lowering of the gas pressure in the conveyor,
   whereby the fluidized powder material is conveyed to said supply hopper until said hopper is refilled, thereby causing said conveyor to return to a counterbalanced condition.

* * * * *